United States Patent
Lieberman et al.

(10) Patent No.: US 10,235,252 B1
(45) Date of Patent: Mar. 19, 2019

(54) RETROACTIVE LOG RETRIEVAL SERVICE (71) Applicant: EMC IP Holding Company LLC, Hopkinton, MA (US)

(72) Inventors: Amit Lieberman, Raanana (IL); Leehod Baruch, Herzliya (IL); Assaf Natanzon, Tel Aviv (IL); Jehuda Shemer, Kfar Saba (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 307 days.

(21) Appl. No.: 15/195,830

(22) Filed: Jun. 28, 2016

(51) Int. Cl.
*G06F 11/14* (2006.01)
*G06F 11/36* (2006.01)

(52) U.S. Cl.
CPC ........ G06F 11/1469 (2013.01); G06F 11/362 (2013.01); *G06F 2201/84* (2013.01)

(58) Field of Classification Search
CPC ............. G06F 11/1469; G06F 11/1471; G06F 11/1474; G06F 2201/80
USPC .......................... 707/684, 682, 683, 999.202
See application file for complete search history.

(56) References Cited

U.S. PATENT DOCUMENTS

| | | | | |
|---|---|---|---|---|
| 7,043,524 | B2 * | 5/2006 | Shah | H04L 63/0281 707/999.009 |
| 7,062,567 | B2 * | 6/2006 | Benitez | G06F 8/65 709/217 |
| 8,549,154 | B2 * | 10/2013 | Colrain | G06F 17/30371 709/227 |
| 8,831,995 | B2 * | 9/2014 | Holler | G06F 8/65 705/51 |
| 8,965,851 | B2 * | 2/2015 | Paterson | G06F 11/1451 707/654 |
| 2006/0168174 | A1 * | 7/2006 | Gebhart | G06F 9/5033 709/223 |
| 2008/0120129 | A1 * | 5/2008 | Seubert | G06Q 10/06 705/35 |
| 2011/0159854 | A1 * | 6/2011 | Kedefors | H04L 51/16 455/414.1 |
| 2015/0112940 | A1 * | 4/2015 | Ozaki | G06F 11/1471 707/648 |

* cited by examiner

*Primary Examiner* — Dung K Chau
(74) *Attorney, Agent, or Firm* — Staniford Tomita LLP (57) ABSTRACT

A history of requests issued to an application executing in a production environment is stored. The application includes an event logging option set to record a first level of detail in a first log file. While the application is executing in the production environment, a determination is made that the application may have a bug. A backup of the application is restored to a test environment. The event logging option in the restored application is changed to record a second level of detail, greater than the first level of detail, in a second log file. The history of requests is replayed against the restored application having the changed event logging option to generate the second log file.

18 Claims, 6 Drawing Sheets

RETROACTIVE LOG RETRIEVAL SERVICE

TECHNICAL FIELD

Embodiments are generally directed to application troubleshooting, and more specifically to a retroactive retrieval of event logs to facilitate troubleshooting.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Applications typically maintain event logs. The event logs record various events as an application carries out its various operations. Reviewing these logs can be helpful in identifying and diagnosing problems with the application. Typically, however, an application deployed within a production environment will be configured to log at a very high level of granularity because very detailed low-level logging increases the size of the log file and reduces the performance of the application.

Thus, the event logs for an application deployed within the production environment will often lack the level of detail desired for addressing and reproducing issues that a user may have encountered with the application.

There is a need, therefore, for improved systems and techniques for obtaining detailed and relevant event logs without disrupting the performance of the application in the production environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for facilitating the debugging of applications or services that can run on a PaaS (platform as a service) cloud platform. The cloud platform may be Cloud Foundry as provided by Cloud Foundry Foundation of San Francisco, Calif. Cloud Foundry is an open source cloud platform as a service on which developers can build, deploy, run and scale applications on public and private cloud models. Some embodiments of the invention may involve automated backup and recovery techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
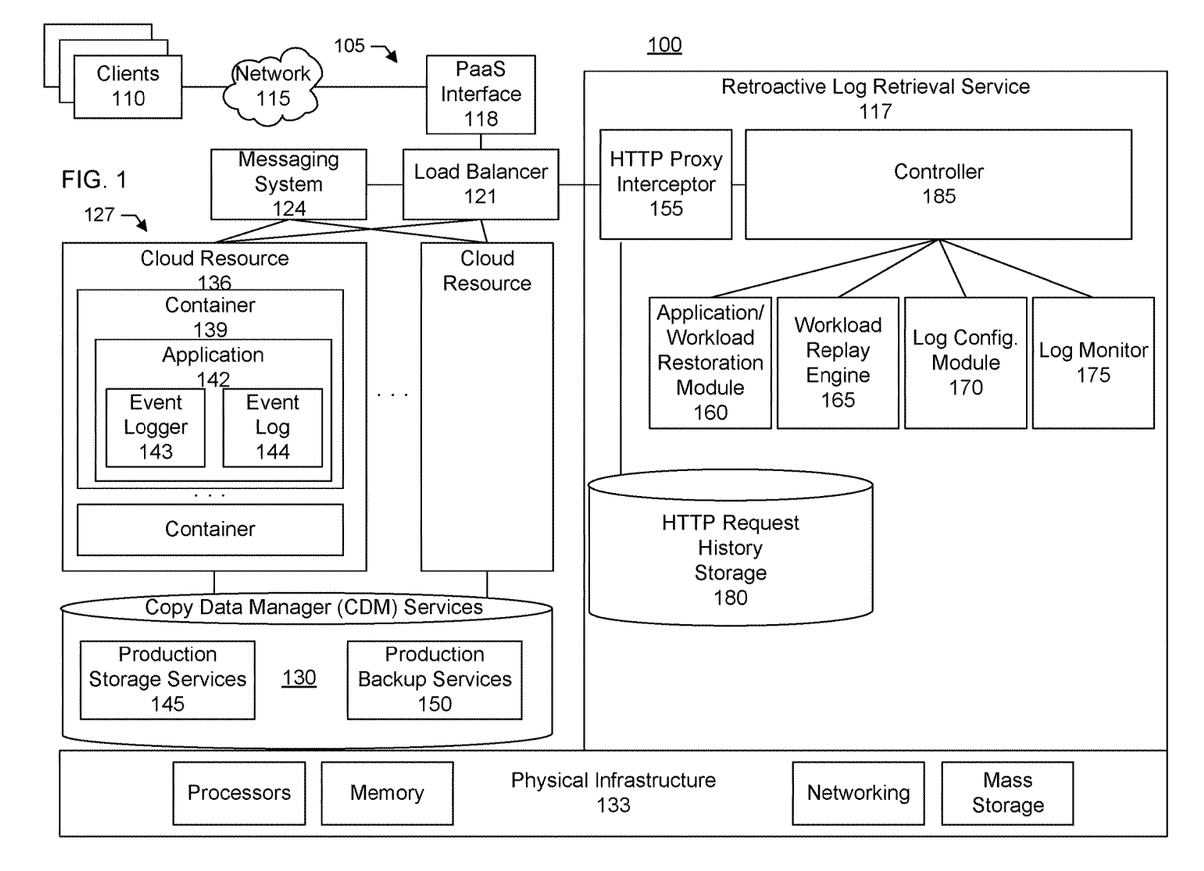
FIG. 1 is a diagram of a large-scale network implementing a system for a retroactive log retrieval service, under some embodiments.

FIG. 1 illustrates a simplified block diagram of a computing environment 100 that implements one or more embodiments of a system for facilitating the debugging of an application or service. In the example shown in FIG. 1, there is a PaaS platform 105, a set of clients 110, and a network 115 connecting the clients and PaaS platform. Platform as a service or PaaS refers to a cloud-based environment that developers can use to develop, test, run and manage their applications. Developers are provided with a development environment that enables the creation and deployment of web-based application software and services, without the complexity of buying, building or managing the underlying infrastructure. PaaS is a model for running an application as a service. PaaS allows automation involving running and scaling an application such as a web application. Users at the clients access the cloud services via the network. The users may include application developers, customers of the application developers, or both.

In an embodiment, the platform includes a retroactive log retrieval service 117. The retroactive log retrieval service allows for the generation of detailed application event logs or debug logs that a developer may use to troubleshoot the application or service. In an embodiment, a debug log for an application is generated using historical activity and data—captured from a production version of the application—that lead or preceded the potential bug or malfunctioning of the application or service.

When a customer complains of incorrect behavior of an application in production, developers often look at logs to try to understand the root cause of the software glitch. To shed more light about the issue, customers are often instructed to change the application to "debug log level" and wait for the issue to be reproduced—then resend the larger log with the detailed description of the system around the failure. This approach is problematic for at least three main reasons:

1) Sometimes an issue is hard to reproduce and only happens occasionally;
2) When the application is on "debug mode" logs generated by the application until reproduced occupy expensive disk space and slow down the normal operation of the application; and
3) Doing these operations requires the customer, development operations (dev-ops) teams, or both to spend time on reproducing and harvesting logs instead of concentrating on other priorities and wastes or is an efficient use of time.

The retroactive log retrieval service allows for automatically retrieving the logs in "debug mode" after hand or after the fact. That is, an application or service can run in a production environment where the generated logs do not have the level of detail in a debug log, but yet the debug log can be retrieved after the bug is encountered. In an embodiment, the retrieval of the debug log may be accomplished with a click. The ease with which the debug log can be retrieved improves the process of fixing software bugs and quality of service. In a specific embodiment, the retroactive log retrieval service is implemented in conjunction with a PaaS system and copy data management to replay minimal or at least some historical workload utilizing historical copies while setting the application to "debug" hence retrieving the original logs (i.e., the debug logs that would have been generated had the production version of the application been set to debug mode). In an embodiment, the retroactive log retrieval service can be applied to all web applications, mobile applications, or both that are running within PaaS (which is the main use case for PaaS based apps).

There can be two ways to interact with the "retroactive-logs-retrieval" service to obtain—retroactively—debug logs. A first way may be referred to as self-service or on-demand. In the self-service technique, a developer that would like to get retroactive logs will login to the system feed the service that he wants to get the logs for. A second way may be referred to as proactive. For the proactive technique, the developer, DevOps team member, or both can set conditions for which when satisfied retroactive logs will be automatically generated based on alerts, error patterns, or both in the info-level logs.

In an embodiment, orchestrating data playback is as follows. According to the service requested, the system determines the data graph needed to be restored from backup in order to reproduce the logs. A data graph can provide a container for a tree or hierarchical representation of related data objects. It is desirable to isolate the service itself in order to move as little data as possible. In an embodiment, this is facilitated through the tight integration between copy data management and the PaaS. The isolated service(s) containers run with system clocks identical to the time the original workload played. In an embodiment, only the subsystem that is required to get the workload into the service is being orchestrated.

Log level could be set to debug for only the container/service requested or for a broader set of services. The debug mode could be set to the entire period of playback or only adjacent to the part in which the error occurred. The starting point in time for the playback with debug mode is configurable such as by the developer user.

Depending on the service topology, traffic will be replayed. In an embodiment, in case for example the service is a backend service reading messages from a queue—no additional steps are required as the messaging system is restored for the same state—and the service picks up the messages. In case the service has an http frontend, the service uses the http traffic replicated data to replay the exact workload.

Due to the asynchronous nature of distributed PaaS applications, some bugs may be more difficult than others to reproduce. Since those systems have access to hypervisors either on public or private cloud—the retroactive log retrieval service can take advantage of available resources to retry reproducing the issue several times until succeeding or until a threshold is reached. The threshold may be a duration of time or a number of retries.

In embodiment, there are two options to detect the issue has been reproduced. A first option is referred to as log pattern. The log pattern option allows the developer to feed or input a regular expression that he expects in the debug-level log once reproduced. The retroactive log retrieval service receives the expression and when it is detected, the replay stops.

A second option is referred to as quantity based. For the quantity based option, the developer instructs or specifies the number of times the process should be replayed. Once done, the system will first analyze anomalies in the logs generated according to size, for example, and present the generated logs in order of variance.

Below are some benefits of the retroactive log retrieval service.

1) Supporting automatic retroactive logs retrieval will improve the overall organization performance and quality;
2) Reduce cost: developers/DevOps not spending time on repetitive actions as a machine can;
3) Being able to solve those hard-to-reproduce bugs sometimes having to live with since it is so hard to reproduce;
4) Faster bugs resolution makes customers happy (e.g., improves customer satisfaction); and
5) With automatic detection—saving time by performing the retroactive retrieval overnight (or during off-peak hours)—and detecting bugs that could otherwise be missed.

Referring now to FIG. 1, the network provides connectivity to the various systems, components, and resources of the distributed computer network shown in FIG. 1. The network may be implemented using protocols such as Transmission Control Protocol (TCP) and/or Internet Protocol (IP), well known in the relevant arts.

In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

The cloud platform may include a variety of applications, libraries, frameworks, modules, components, interfaces, layers, and subsystems. In the example shown in FIG. 1, the platform includes retroactive active log retrieval service 117, a cloud platform interface 118, load balancer 121, messaging system 124, a set of cloud resources 127, copy data manager (CMD) services 130, and physical infrastructure or hardware layer 133 that supports the various cloud services and components. The physical infrastructure layer may include any number of interconnected servers, networking equipment, switches, routers, disk arrays, and the like.

The cloud interface presents an interface to the clients through which the platform services and applications hosted by the platform may be accessed and communications, instructions, and responses exchanged. The interface may include, for example, a programmatic interface such as an application programming interface (API), graphical user interface (GUI), or both.

The load balancer receives incoming traffic and requests, and can route or direct the traffic to the appropriate cloud resource for processing. The messaging system is responsible for exchanging or passing messages between the various applications, application components or parts, services, processes, and so forth on the cloud platform. For example, when one application (producer or sending application) wishes to send a message to another application (consumer or receiving application), the producer can send the message to the messaging system. The messaging system places the message in a message queue. The consumer or receiving application connects to the queue to retrieve and process the message.

In an embodiment, a cloud resource provides or hosts a virtual environment in which an application or component of the application may be deployed. A virtual environment may include a virtual machine (VM) or container. A VM is an operating system (OS) or application environment that is installed on virtualization software which imitates dedicated hardware. In other words, the virtualization software such as a hypervisor emulates a hardware processor, memory, hard disk, network and other hardware resources, to enable the sharing of the resources. Container-based virtualization, also referred to as operating system virtualization, is a virtualization technique in which the virtualization layer runs as an application within the operating system (OS). The operating system's kernel runs on the hardware node with several isolated guest virtual machines or containers installed on top of it.

In the example shown in FIG. 1, a cloud resource 136 includes a virtual environment such as a container 139 having an application or service 142. The application may be, for example, a web application. A web application is a type of client-server software application that can be accessed by a web browser program executing at the client. The web browser can run or display a user interface of the web application. Some examples of web applications include browser-based word processing and spreadsheet programs, webmail, content management systems, online shopping programs, and many others.

The cloud resources process workloads. A workload may include an application, service, process, set of processes, task, set of tasks, or combinations of these. Activity associated with or included in a workload may include requests such as HTTP requests issued to the application, messages received from other applications or services, messages sent to other applications or services, or combinations of these.

The application or service includes an event logger 143. During runtime or execution, the event logger writes various types of events or messages as records to an event log file 144. These events may be recorded in real-time as they occur. The messages describe things that happen during a particular operation. These messages can be helpful when trying to troubleshoot, identify and fix problems, diagnose issues, improve performance, monitor activity, or maintain an application or service.

Depending upon the particular application or service, there can be many different types or categories of events that can be recorded. For example, there can be application program events including error, warning, or informational events. Error events may indicate significant problems such as loss of data. Warning events may indicate possible future problems. An informational event may describe the successful operation of a program, driver, or service. There can be security-related events indicating, for example, whether or not a user's login to the application was successful or unsuccessful. Each event record in the event log may include a timestamp indicating the date and time the event occurred, a brief description of the event, an identification of a process associated with the event, the type of event, and so forth.

The event logger may include a logging configuration option, setting, or mode that controls a level of detail recorded in the log file. That is, the level of detail may vary depending upon the logging configuration option. For example, based on the logging configuration option selected, some event types may be recorded while other event types are not recorded, a description for a particular event may include more or less detail or information, a parameter for a particular event may or may not be captured, some steps may be recorded while other steps are not recorded, some tasks may be recorded while other tasks are not recorded, and so forth.

In a production environment, it can be desirable to configure the event logger such that only very little information or detail is logged. For example, for a production deployment of the application or service, the event logger may be configured to record only critical events and not record other events that are not critical. Reducing the amount of detail that is logged can help to conserve system resources such as disk space and processing cycles.

Conversely, in a test environment it can be desirable to configure the event logger such that a high level of detail is logged. For example, for a test version or instance of the application or service, the event logger may be configured to log more or all events such as debugging statements that were inserted during development of the application or service, a detailed set of operations that were performed for a particular task, and so forth. The additional level of detail recorded in the resulting event log can be helpful in troubleshooting a problem, improving performance, or both. A log having this additional level of detail may be referred to as a debug log.

In an embodiment, the copy data manager stores and manages data generated by the application or service, received by the application or service, or both. More particularly, the copy data manager may provide production storage and backup services 145, 150. Production refers to the environment that includes the processes, hardware, and software for the real-time staging and execution of programs and services. The backup services are responsible for backing up the production environment. This may include, for example, periodically backing up the production application, workloads, workload activity, data stores, databases, services, messaging system and messaging queues, and so forth.

The retroactive log retrieval service includes several modules including an HTTP proxy interceptor 155, application/workload restoration module 160, replay engine 165, log configuration module 170, log monitor 175, and storage 180 storing a history of requests to the application or service or other workload activity. The operation of the modules may be managed by a controller 185.

In an embodiment, the HTTP proxy interceptor is responsible for recording Hypertext Transfer Protocol (HTTP) requests issued to the application or service and storing a history of the requests in the request history storage. For example, the client may include a browser which sends a request message to an application hosted by a server at the cloud platform. The application, in turn, returns a response message that can include the requested resource or content. An HTTP request may specify, for example, a method and request-URI (Uniform Resource Identifier). The request-URI identifies a resource upon which the method is to be performed. For example, the "GET" method requests data from the resource. The "POST" method submits data to be processed by the resource. These requests may be time-stamped and stored in the request history storage.

In an embodiment, storage 180 is object storage or a document store rather than, for example a database. Object storage is considered more scalable than traditional file system storage because instead of organizing files in a directory hierarchy, object storage systems store files in a flat organization of containers and use unique IDs to retrieve them. Object storage systems require less metadata than file systems to store and access files, and they reduce the overhead of managing file metadata by storing the metadata with the object. Storing in a database or database tables is typically slower to access than object storage. The incoming requests can be stored as read-only and without the need for updating, there is no need for indexing tables.

In another embodiment, the requests may be stored in a time series database (TSDB). A time series database is optimized for handling time series data (e.g., arrays of numbers indexed by time). The time series database can help to facilitate the chronological replay of a workload.

The restoration module is responsible for restoring the appropriate backup of the production environment made at a particular point in time to a test environment. A restored backup may include a restored application, database, service, workload, messaging system, messaging queue, state, runtime parameters or variables backed up from production, and so forth as these data objects existed at the particular point in time the backup was made.

The log configuration module is responsible for configuring or changing an event logging level option in the restored application or service from a first level of detail to a second level of detail, greater than the first level of detail. For example, when the logging option is set at the second level of detail, the application records more detailed information in an event log as compared to when the logging option is set at the first level of detail.

The replay engine is responsible for replaying restored activity against the restored application or service. For example, an application may be restored to a particular point in time. The activity may include a historical listing of HTTP requests issued to the application starting or corresponding to the particular point in time. The replay engine replays these historical requests against the restored application. As the requests are being replayed, the restored application generates an event log having a greater level of detail as compared to a corresponding event log generated for the same requests when the application was in the production environment.

The log monitor is responsible for proactively monitoring the production version of the event logs. When the log monitor detects the logging of a particular event, a pattern of logged events, or both, the log monitor can notify the controller to automatically trigger a retroactive log retrieval.

Figure 2:
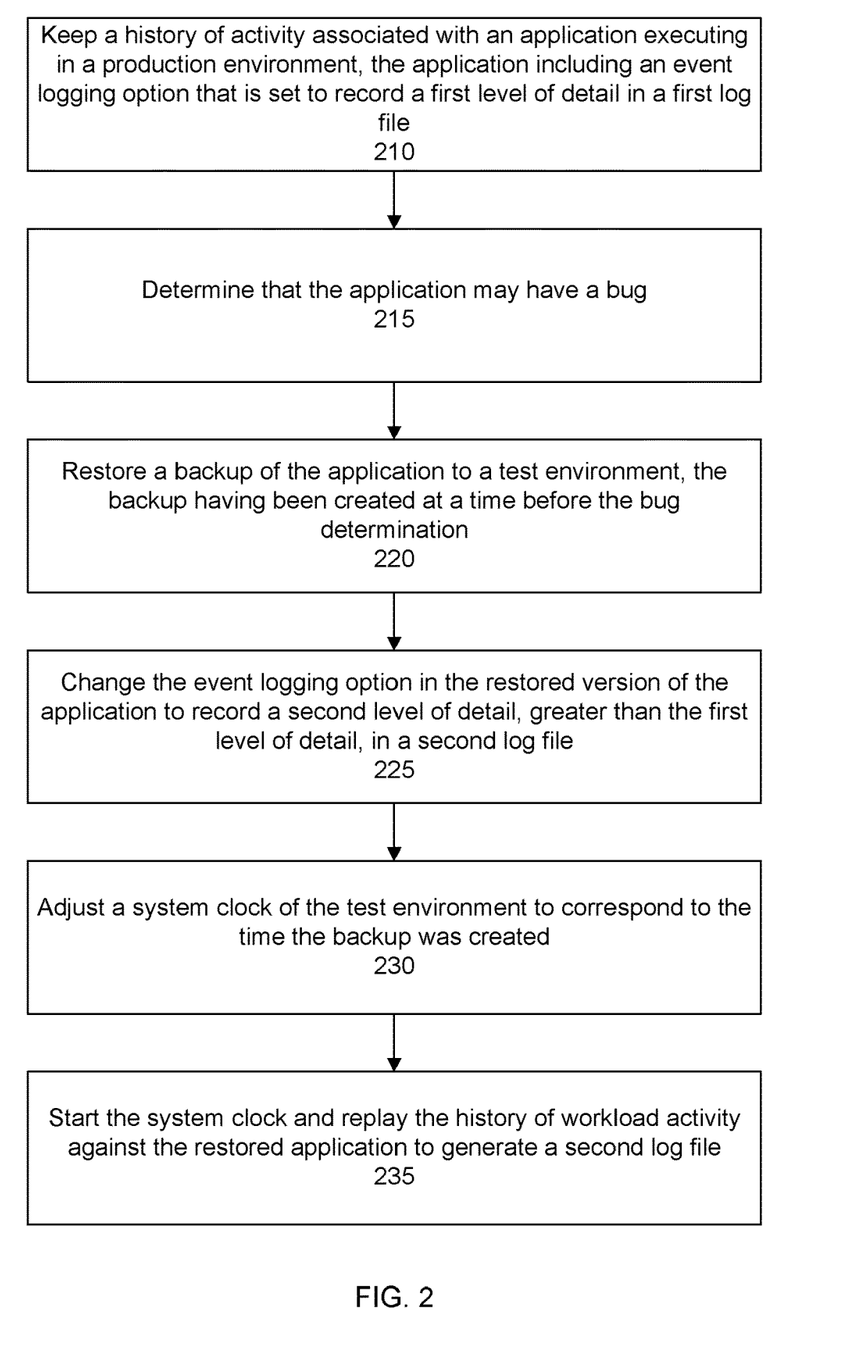
FIG. 2 shows an overall flow of a process for retrieving logs retroactively, under some embodiments.

FIG. 2 shows an overall flow of a process for retroactive log retrieval. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, the retroactive log retrieval service stores, maintains, or keeps a history of activity associated with an application (or service) executing in a production environment where the application includes an event logging option that is set to record a first level of detail in a first log file. In a specific embodiment, the history of activity includes requests issued to the application or service. The requests may include HTTP requests or messages. In other words, the requests issued to the application are backed up so that the workload can be replayed later if necessary to generate a detailed log file (e.g., debug log).

Figure 3:
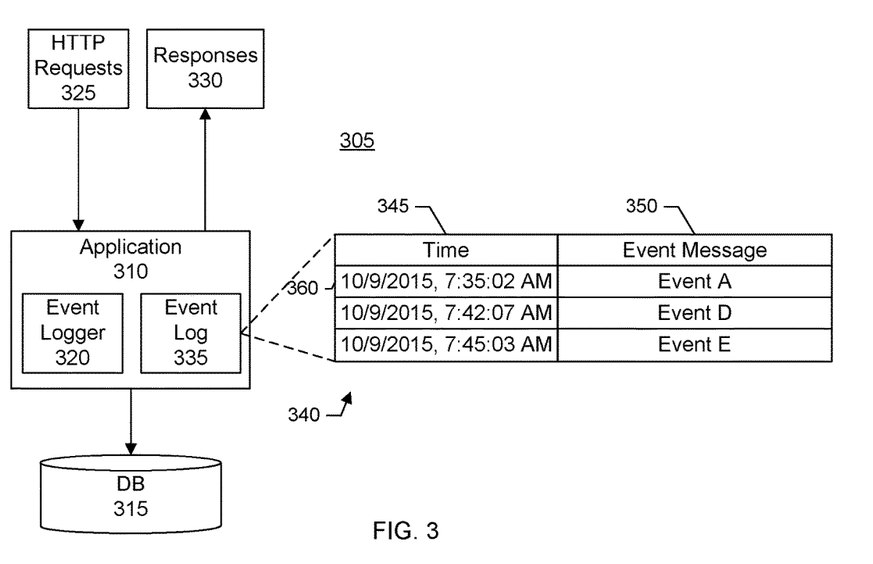
FIG. 3 shows an application generating an event log in a production environment.

FIG. 3 shows an example of logging in a production environment 305. The production environment includes an application 310 and a database 315 connected to the application. The application includes an event logger 320. During runtime, the application receives requests such as HTTP requests 325, processes the requests, and responds accordingly 330. As the application processes the requests, the event logger writes to an event log 335. The event log, based on the log configuration setting in the event logger, records high-level events associated with the processing of the requests. The events may be recorded in chronological or reverse chronological order. As shown in the example of FIG. 3, the log file includes a set of records 340 corresponding to the events. A record for an event may include a timestamp 345 indicating the time and date that the event occurred and a message 350 describing the event.

Referring back now to FIG. 2, in a step 215, a determination is made that the application in the production environment may have a bug, problem, or other issue. In a step 220, based on the determination, a backup of the application is restored to a test environment, where the backup is created at a point in time before the bug determination. The restoration may include restoring the application binary and corresponding database to that point in time.

In a step 225, the event logging option in the restored version of the application is changed, altered, or modified to record a second level of detail, greater than the first level of detail, in a second log file. In a step 230, a system clock of the test environment is adjusted to correspond to the time the backup was created. In a step 235, the system clock is started, and the retroactive log retrieval service performs an automatic replay of the activity history against the restored application to generate the second log file.

The activity history may be replayed in chronological order (e.g., from the oldest activity to the most recent activity). For example, where the activity history includes historical HTTP requests issued to the application, a first historical HTTP request issued to the application at a first time may be replayed against the restored application. After the first historical HTTP request has been replayed, a second historical HTTP request issued to the application at a second time, after the first time, may be replayed against the restored application.

During the replay of the activity history (e.g., historical HTTP requests) against the restored application, the restored application logs events in the second log file. The second log file may then include a greater level of detail than the first log file because the restored application has been set to log a greater level of detail as compared to the production backup of the application. The retroactive log retrieval service may then send the second log to the user (e.g., developer) that requested a retroactive log.

Figure 4:
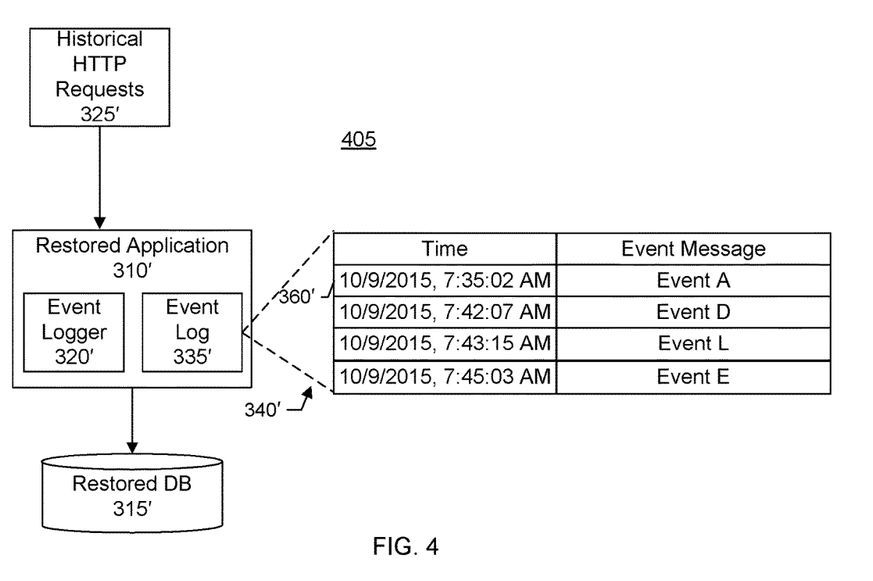
FIG. 4 shows a restored version of the application in FIG. 3 generating a more detailed event log in a test environment.

FIG. 4 shows an example of logging in a test environment 405. The test environment includes an application 310' and database 315'. Application 310' and database 315' represent the restored versions of application 310 and database 315 from the production environment shown in FIG. 3. In other words, the instance of the application in the test environment is different from the instance of the application in the production environment and is pointing at a backup copy of the production data. The restored backup may be referred to as a hydrated copy.

Further, in the restored version of the application the log configuration setting in event logger 320' is changed to record an extensive level of detail (step 225—FIG. 2). A set of historical requests 325' are replayed or applied to the restored application. The historical requests correspond to or are the same set of requests that were issued to the production version of the application. As the set of historical requests are replayed, the restored version of the application processes the requests, and the event logger writes to an event log 335'.

As shown in the example of FIG. 4, however, event log 335' contains more detail than event log 335 (FIG. 3) that was generated during the production environment. A number of events recorded in event log 335' may be greater than a number of events recorded in event log 335 even though the production and restored version of the application will have processed the same requests. Likewise, a number of types of events recorded in event log 335' may be greater than a number of types of events recorded in event log 335. Descriptions of events recorded in event log 335' may be more verbose than descriptions of events recorded in event log 335. For example, the descriptions of events in event log 335' may have more parameters, variables, words, characters, or combinations of these than the descriptions of events in event log 335. The events recorded in event log 335 may be a subset of events recorded in event log 335'. The additional level of detail recorded in event log 335' can be used to better troubleshoot the application as compared to event log 335.

Adjusting the system clocks (step 230—FIG. 2) helps to replicate the conditions of the production environment. Adjustment of the system clock also helps to facilitate a cross-referencing or identification of events recorded in event log 335' that are contemporaneous with a time at which the potential bug determination was made. For example, event log 335 (FIG. 3) shows an event 360 that was logged on Oct. 9, 2015 at 7:35:02 AM. Likewise, event log 335' (FIG. 4) also shows a corresponding event 360' that was logged at the same time and date. Although the real time at which event 360' is logged will have been after that time of Oct. 9, 2015, 7:35:02 AM, adjusting the system clock in the test environment to correspond to the time and date of the original workload in the production environment helps to simulate a debug log as it might have existed in the production environment.

In a specific embodiment, the retroactive log retrieval service attempts to mimic the timing of the historical requests with the timing of the requests as they were issued in the production environment. In this specific embodiment, the service reviews or examines a time that a particular request was issued in the production environment. When a system time of the test environment matches the time that the particular request was issued in the production environment, the service replays a historical, saved, or archived version of the particular request against the restored application in the test environment. If the system time of the test environment does not match the time that the particular request was issued in the production environment, the service pauses the replay until the system time does match the time that the particular request was issued in the production environment. In other words, a replay of a request in the test environment may be triggered when a system clock of the test environment matches or corresponds to a time that the request was issued in the production environment.

Timing the requests to match the time that they were actually issued in the production environment helps to better simulate a debug log as it might have been generated in the production environment. For example, if a request in the production environment was issued Oct. 9, 2015 at 7:35:02 AM, the retroactive log retrieval service can wait or pause operation until the time of Oct. 9, 2015 at 7:35:02 AM before replaying that same request in the test environment against the restored version of the application where the logging option has been set to debug.

Alternatively, in another specific embodiment, the retroactive log retrieval service may perform an automatic replay of the historical requests without regard to the timing of the requests as they were issued in the production environment. This technique can be advantageous when there is a desire to rapidly generate a debug log. For example, the requests may have been issued over a period of several hours (e.g., 8 hours). In this specific embodiment, when the historical or saved requests are replayed in the test environment against the restored version of the application (with the logging option set to debug), the service may complete the replay within a shorter time period (e.g., 1 hour).

In a specific embodiment, the retroactive log retrieval service stores a historical record of requests (e.g., HTTP requests), but responses corresponding to the requests are not stored. Not storing the responses helps to reduce the amount of data that is stored. Applicants have appreciated and recognized that for the purposes of generating a detailed debug log the responses (e.g., content) returned by the application can be omitted. Backing up HTTP requests consumes a relatively small amount of space because the requests are usually small and text-based whereas the corresponding responses can be much larger. In another specific embodiment, however, both a historical record of requests and corresponding responses are stored.

The time to which the application or service (and corresponding historical activities) should be restored or rolled back to in order to retroactively retrieve a debug log can be user-configurable. For example, the time may be 15 minutes, 30 minutes, one hour, five hours, 1 day, or 2 days before the determination that the application or service may have a bug. The time may be based on an event recorded in the log (e.g., restore to a time of last upgrade as recorded in the log, restore to a time before the last upgrade as recorded in the log, or restore to a time that the application was last started).

Figure 5:
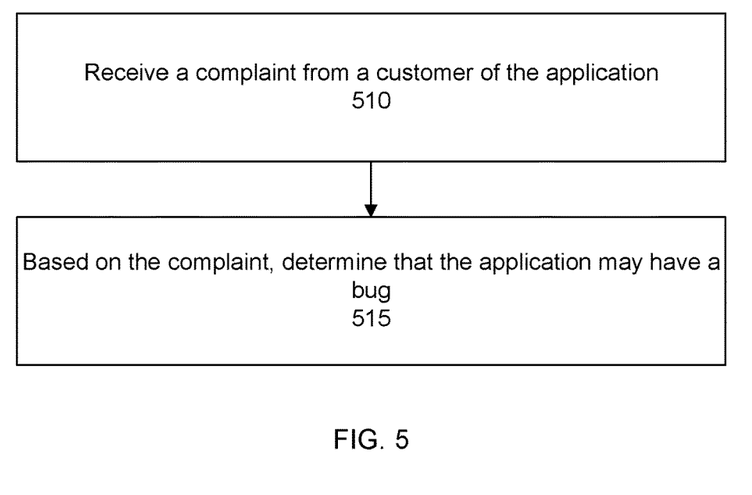
FIG. 5 shows a flow for determining that an application may have a bug.
Figure 6:
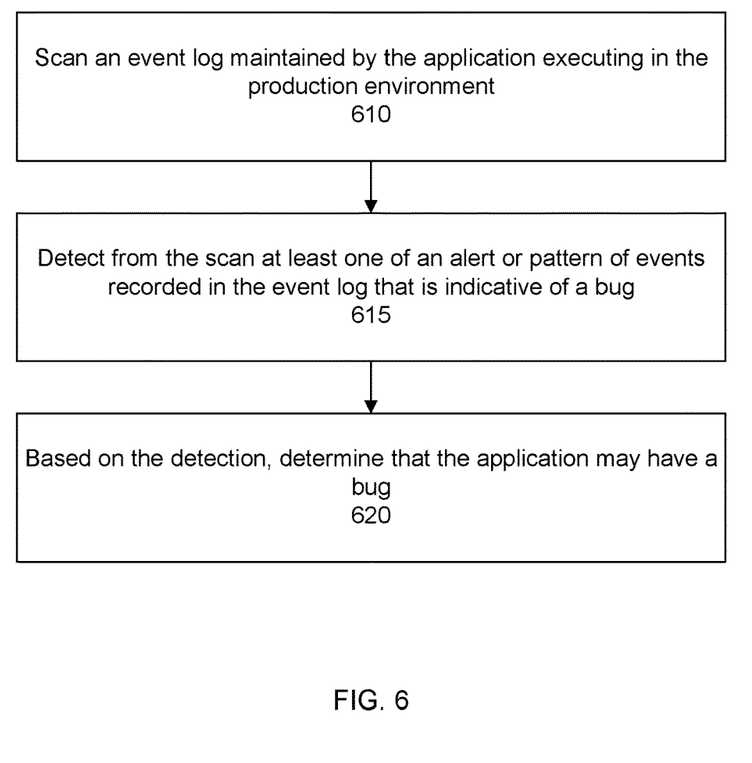
FIG. 6 shows another flow for determining that an application may have a bug.

FIGS. 5-6 show flows for determining that the application or service may have a bug (step 215—FIG. 2) according to various specific embodiments. Referring now to FIG. 5, in a step 510 a complaint is received from a customer of the application. In a step 515, based on the complaint, a determination is made that the application may have a bug. For example, a developer of the application may receive a complaint from one of their customers that the application does not appear to be functioning correctly. The developer can access the retroactive log retrieval service and request a retroactive debug log for the application. The request may specify, for example, the application to be restored, the backup that should be restored, a point in time before the bug determination from which replay should occur, a number of times the replay should occur, an expression to search for in the resulting debug log, or combinations of these.

FIG. 6 shows another flow for determining that the application may have a bug. In a step 610, the retroactive log retrieval service scans an event log maintained by the application executing in the production environment. For example, the service may be configured to scan the event log periodically such as nightly or during off-peak hours or at any other frequency and time desired (e.g., hourly).

In a step 615, the service detects from the scan at least one of an alert or pattern of events recorded in the event log that is indicative of a bug. For example, a retroactive log retrieval may be automatically triggered once the service finds that an event of a particular type (e.g., alert, critical, fatal, warning) has been recorded. A retroactive log retrieval may be automatically triggered once the service finds that a particular message string has been recorded. Instead or additionally, a retroactive log retrieval may be automatically triggered once the service detects an unusual patterns of events that have been recorded in the log file.

In a step 620, based on the detection, a determination is made that the application may have a bug or other issue. In a specific embodiment, upon the determination, the retroactive log retrieval service performs, automatically, the retroactive retrieval of a log (e.g., debug log) according to steps 220-235 (FIG. 2). Thus, a debug log may be automatically generated before a user (e.g., developer) formally requests the debug log. Once the debug log has been generated, the retroactive log retrieval service may automatically email the debug log to the developer. Instead or additionally, another type of alert or notification may be generated (e.g., text message).

This proactive technique for retroactively generating a debug log helps to facilitate a quick assessment and resolution of the problem. For example, during a nightly scan of the non-debug level logs from the production environment, the retroactive log retrieval service may detect a pattern of events indicative of a bug. Upon the detection, the service can restore a backed up version of the application to the test environment, automatically change the logging level in the restored version of the application from the non-debug level to a debug level, and automatically replay at least a subset of historical requests against the restored version of the application to generate a debug log. The debug log can be emailed to the developer so that the developer can review the debug log as soon as he arrives for work in the morning.

Figure 7:
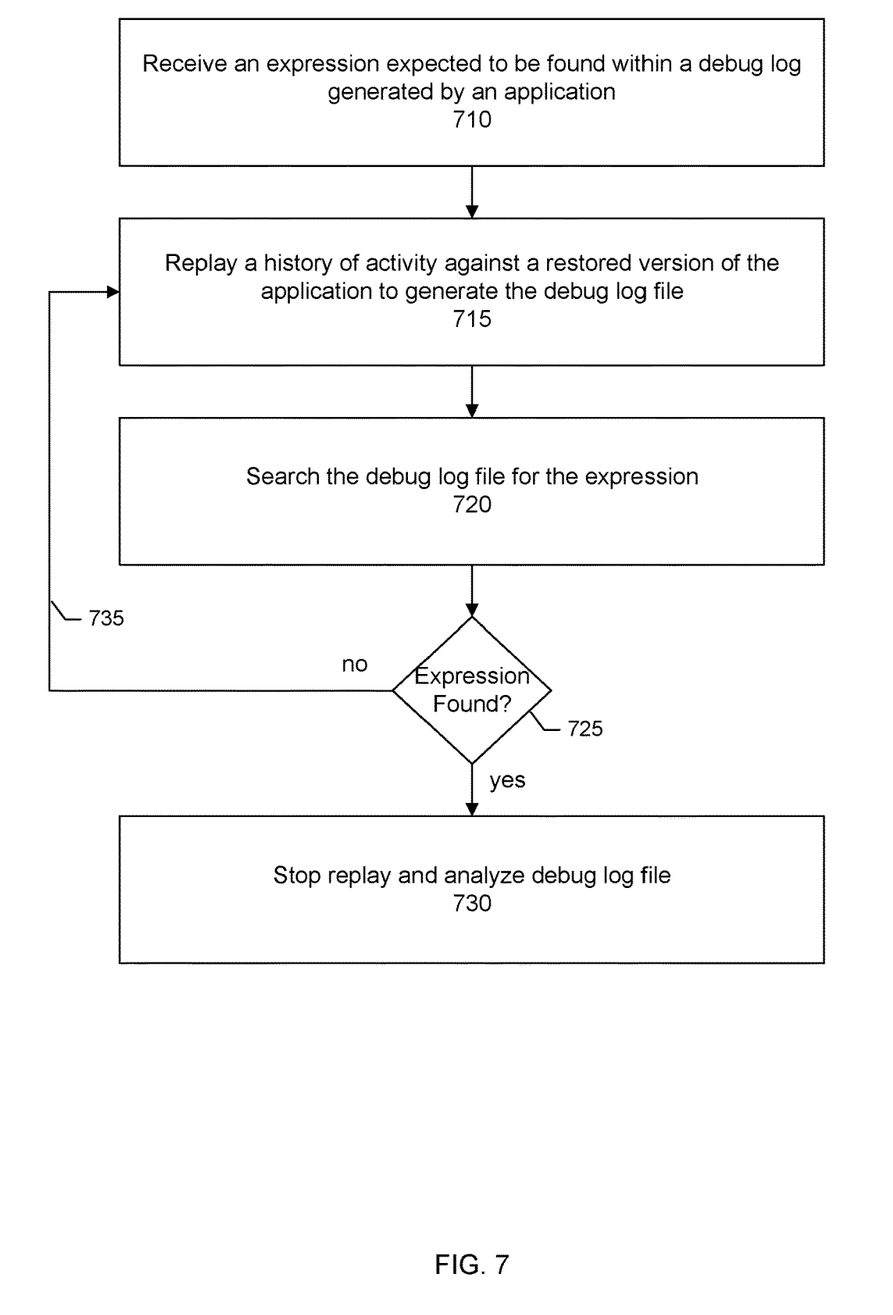
FIG. 7 shows a flow of a process for reproducing the bug issue.
Figure 8:
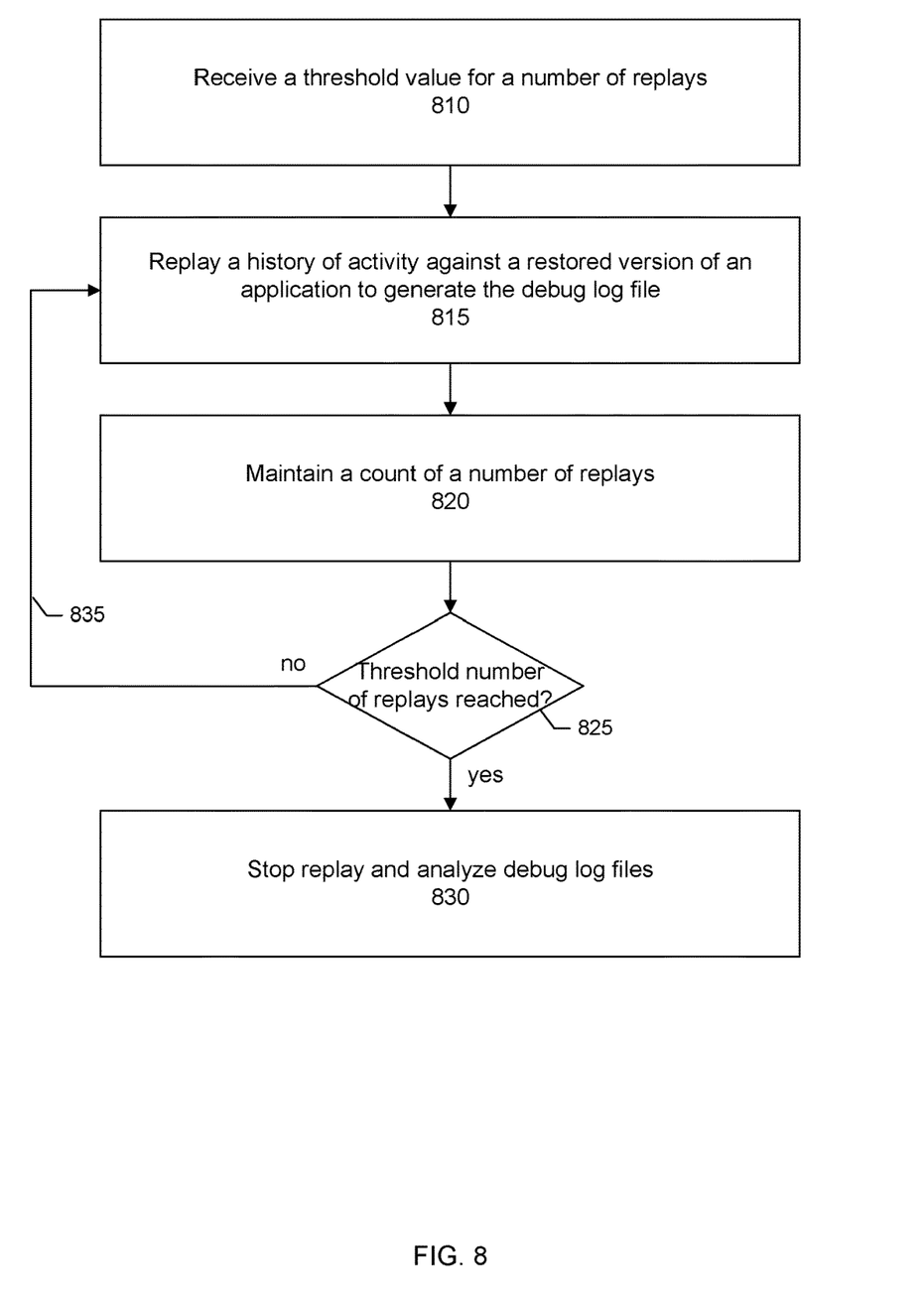
FIG. 8 shows another flow of a process for reproducing the bug issue.

FIGS. 7-8 show process flows for detecting whether the issue has been reproduced. These flows can be especially useful for uncovering issues in asynchronous systems such as distributed PaaS applications. Modern applications do not always follow a sequential execution of instructions. Rather, there can be multiple threads of control, an asynchronous exchange of data, sequences of instructions operating in parallel and communicating with each other, many different variables, and so forth. Thus, it can be helpful to replay multiple times (e.g., two or more times). The flows shown in FIGS. 7-8 provide techniques that can be used to flush out and detect bugs or other issues.

Referring now to FIG. 7, in a step 710, the retroactive log retrieval service receives an expression expected to be found within a debug log generated by an application (or service). The expression may include, for example, a debug string. The expression may be based on the developer's suspicion of what might be wrong with the application. In a step 715, the service replays a history of activity against a restored version of the application to generate a debug log file. In a step 720, the service searches the debug log for the expression. In a step 725, a determination is made as to whether the expression was found in the debug log.

If the expression was found in the debug log, in a step 730 the service stops the replay and the debug log is analyzed. Alternatively, if the expression was not found in the debug log, the process loops back 735 to replay the activity and generate another debug log to search.

FIG. 8 shows another flow for reproducing an issue. In a step 810, the retroactive log retrieval service receives a threshold value specifying a number of replays. In a step 815, the service replays a history of activity against a restored version of the application to generate a debug log file. In a step 820, service maintains a count of a number of replays. In a step 825, a determination is made as to whether the threshold number of replays has been reached.

In a step 830, if the threshold number of replays has been reached, the service stops the replay and analyzes the debug log files. Alternatively, if the threshold number of replays has not been reached, the process loops back 835 to step 815 to again replay the history of activity against the restored application to generate another debug log file.

In an embodiment, the service increments a counter variable that represents a number of times a replay has been performed. If this number exceeds the threshold then the replay is stopped. If this number does not exceed the threshold the system performs another replay. In another embodiment, the service decrements a counter variable that represents the number of times a replay is to be performed. When the counter variable reaches zero, the replays stop. The technique shown in FIG. 8 helps to automatically generate a good number of debug logs for analysis, but not an excessive number and thus prevents the over-taxing of system resources.

As discussed above, a specific embodiment of the retroactive log retrieval service is within a PaaS platform. The various libraries, frameworks, and services provided with PaaS, allow for a very efficient way to run multiple instances of an application, point the application to other databases (or a backup copy of a database), backup the application, start an instance, and so forth since a web application functions via a URL (universal resource locator). It should be appreciated, however, that aspects and principles of the retroactive log retrieval service can be applied to other types of applications such as stand-alone desktop applications or applications that are not web applications or are not hosted by a PaaS or cloud platform.

In a specific embodiment, a method includes storing a history of requests issued to an application executing in a production environment, the application comprising an event logging option that is set to record a first level of detail in a first log file; while the application is executing in the production environment, determining that the application may have a bug; restoring a backup of the application from the production environment to a test environment, the backup having been created before the determination of the bug; changing the event logging option in the restored version of the application to record a second level of detail, greater than the first level of detail, in a second log file; and performing an automatic replay of the history of requests against the restored application having the changed event logging option to generate the second log file, the second log file thereby having a greater level of detail than the first log file.

The determining that the application may have a bug may include receiving a complaint concerning the application from a customer of the application or scanning the first log to detect at least one of an alert or pattern of events recorded in the first log by the application that is indicative of the bug.

A number of event types recorded in the second log file may be greater than a number of event types recorded in the first log file. A subset of events in the second log file may be the same as all events in the first log file because the first and second log files were generated using the same requests. In an embodiment, the stored history of requests comprises incoming hypertext transfer protocol (HTTP) requests, and does not comprise responses from the application corresponding to the incoming HTTP requests.

In another specific embodiment, there is a system for retroactively obtaining a debug log, the system comprising: a processor-based system executed on a computer system and configured to: store a history of requests issued to an application executing in a production environment, the application comprising an event logging option that is set to record a first level of detail in a first log file; while the application is executing in the production environment, determine that the application may have a bug; restore a backup of the application from the production environment to a test environment, the backup having been created before the determination of the bug; change the event logging option in the restored version of the application to record a second level of detail, greater than the first level of detail, in a second log file; and perform an automatic replay of the history of requests against the restored application having the changed event logging option to generate the second log file, the second log file thereby having a greater level of detail than the first log file.

In another specific embodiment, there is a computer program product, comprising a non-transitory computer-readable medium having a computer-readable program code embodied therein, the computer-readable program code adapted to be executed by one or more processors to implement a method comprising: storing a history of requests issued to an application executing in a production environment, the application comprising an event logging option that is set to record a first level of detail in a first log file; while the application is executing in the production environment, determining that the application may have a bug; restoring a backup of the application from the production environment to a test environment, the backup having been created before the determination of the bug; changing the event logging option in the restored version of the application to record a second level of detail, greater than the first level of detail, in a second log file; and performing an automatic replay of the history of requests against the restored application having the changed event logging option to generate the second log file, the second log file thereby having a greater level of detail than the first log file.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   storing a history of requests issued to an application executing in a production environment, the application comprising an event logging option that is set to record a first level of detail in a first log file;
   while the application is executing in the production environment, determining that the application comprises a bug;
   restoring a backup of the application from the production environment to a test environment, the backup having been created before the determination of the bug;
   changing the event logging option in the restored version of the application to record a second level of detail, greater than the first level of detail, in a second log file; and
   performing an automatic replay of the history of requests against the restored application having the changed event logging option to generate the second log file, the second log file thereby having a greater level of detail than the first log file.

2. The method of claim 1 wherein the determining that the application comprises a bug comprises receiving a complaint concerning the application from a customer of the application.

3. The method of claim 1 wherein the determining that the application comprises a bug comprises scanning the first log to detect at least one of an alert or pattern of events recorded in the first log by the application that is indicative of the bug.

4. The method of claim 1 wherein a number of event types recorded in the second log file is greater than a number of event types recorded in the first log file.

5. The method of claim 1 wherein a subset of events in the second log file are the same as all events in the first log file because the first and second log files were generated using the same requests.

6. The method of claim 1 wherein the stored history of requests comprises incoming hypertext transfer protocol (HTTP) requests, and does not comprise responses from the application corresponding to the incoming HTTP requests.

7. A system for retroactively obtaining a debug log, the system comprising:
   a processor-based system executed on a computer system and configured to:
   store a history of requests issued to an application executing in a production environment, the application comprising an event logging option that is set to record a first level of detail in a first log file;
   while the application is executing in the production environment, determine that the application comprises a bug;
   restore a backup of the application from the production environment to a test environment, the backup having been created before the determination of the bug;
   change the event logging option in the restored version of the application to record a second level of detail, greater than the first level of detail, in a second log file; and
   perform an automatic replay of the history of requests against the restored application having the changed event logging option to generate the second log file, the second log file thereby having a greater level of detail than the first log file.

8. The system of claim 7 wherein the determination that the application comprises a bug comprises receiving a complaint concerning the application from a customer of the application.

9. The system of claim 7 wherein the determination that the application comprises a bug comprises scanning the first log to detect at least one of an alert or pattern of events recorded in the first log by the application that is indicative of the bug.

10. The system of claim 7 wherein a number of event types recorded in the second log file is greater than a number of event types recorded in the first log file.

11. The system of claim 7 wherein a subset of events in the second log file are the same as all events in the first log file because the first and second log files were generated using the same requests.

12. The system of claim 7 wherein the stored history of requests comprises incoming hypertext transfer protocol (HTTP) requests, and does not comprise responses from the application corresponding to the incoming HTTP requests.

13. A computer program product, comprising a non-transitory computer-readable medium having a computer-readable program code embodied therein, the computer-readable program code adapted to be executed by one or more processors to implement a method comprising:
   storing a history of requests issued to an application executing in a production environment, the application comprising an event logging option that is set to record a first level of detail in a first log file;
   while the application is executing in the production environment, determining that the application comprises a bug;
   restoring a backup of the application from the production environment to a test environment, the backup having been created before the determination of the bug;
   changing the event logging option in the restored version of the application to record a second level of detail, greater than the first level of detail, in a second log file; and
   performing an automatic replay of the history of requests against the restored application having the changed event logging option to generate the second log file, the second log file thereby having a greater level of detail than the first log file.

14. The computer program product of claim 13 wherein the determining that the application comprises a bug comprises receiving a complaint concerning the application from a customer of the application.

15. The computer program product of claim 13 wherein the determining that the application comprises a bug comprises scanning the first log to detect at least one of an alert or pattern of events recorded in the first log by the application that is indicative of the bug.

16. The computer program product of claim 13 wherein a number of event types recorded in the second log file is greater than a number of event types recorded in the first log file.

17. The computer program product of claim 13 wherein a subset of events in the second log file are the same as all events in the first log file because the first and second log files were generated using the same requests.

18. The computer program product of claim 13 wherein the stored history of requests comprises incoming hypertext transfer protocol (HTTP) requests, and does not comprise responses from the application corresponding to the incoming HTTP requests.

* * * * *